(12) United States Patent
Su et al.

(10) Patent No.: US 6,292,093 B1
(45) Date of Patent: Sep. 18, 2001

(54) MULTI-BIT COMPARATOR

(75) Inventors: Shyang-Tai Su, Folsom, CA (US); Donald R Weiss, Ft Collins, CO (US)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 09/507,862

(22) Filed: Feb. 22, 2000

(51) Int. Cl.$^7$ ....................................... G05B 1/00
(52) U.S. Cl. ............................................. 340/146.2
(58) Field of Search ......................................... 340/146.2

(56) References Cited

U.S. PATENT DOCUMENTS 4,323,982 * 4/1982 Eichrodt et al. ..................... 364/786

* cited by examiner

*Primary Examiner*—Margaret R. Wambach

(57) ABSTRACT

A circuit for signalling if any like ordered bits $A_k$ and $B_k$ in first and second binary words differ comprises a comparator for each pair of like ordered bits and a common terminal. Each comparator includes first and second FETs arranged so: (a) the first and second levels of $A_k$ are coupled to the common terminal via the first FET in response to $B_k$ having the first value, (b) the first and second levels of $B_k$ are coupled to the common terminal via the second FET in response to $A_k$ having the first value, (c) the first FET decouples $A_k$ from the common terminal and tends to cause the common terminal to be at the second level in response to $B_k$ having the second value, (d) the second FET decouples $B_k$ from the common terminal and tends to cause the common terminal to be at the second level in response to $A_k$ having the second value, and (e) the common terminal is at the second level only in response to $A_k \neq B_k$. A FET connected as a diode and coupled between the common terminal and each of the FETs maintains the common terminal at the second value in response to $A_i \neq B_i$, where i is any value of k.

11 Claims, 2 Drawing Sheets

MULTI-BIT COMPARATOR

TECHNICAL FIELD

The present invention relates generally to multi-bit binary comparator circuits and more particularly to a multi-bit binary comparator circuit wherein the comparator for each pair of bits to be compared includes first and second transistors having paths respectively connected between sources of the bits to be compared and a common terminal, wherein the path of the first transistor is controlled by the value of the second bit and the path of the second transistor is controlled by the value of the first bit.

BACKGROUND ART

In many situations, integrated circuit chips include circuitry for comparing like ordered bits of two multi-bit bytes or words. FIG. 1 is a circuit diagram of a prior art complementary metal oxide semiconductor (CMOS) circuit for deriving a bi-level output having (1) a first value in response to any like ordered bits of first and second 8-bit bytes having different values and (2) a second value in response to all of the like ordered bits of the 8-bit bytes having the same value. In other words, the circuit of FIG. 1 derives a binary output having (1) the first value in response to any of $A_i \neq B_i$ (where $A_i$ is the binary bit of order i of the first word, $B_i$ is the binary bit of order i of the second word and i is each of 0, 1 . . . 7) and (2) the second value in response to each of $A_i = B_i$.

The circuit of FIG. 1 includes a separate comparator 10, 11, 12 . . . 16, 17 for each of the eight like ordered bits $A_i + B_i$ of the two bytes. Because all of comparators 10–17 are the same, the description of comparator 10 which is responsive to bits $A_0$ and $B_0$ of the first and second bytes suffices for the remaining comparators.

Comparator 10 includes signal input terminals 20 and 22 responsive to sources 24 and 26 which derive the binary bits $A_0$ and $B_0$, respectively. Comparator 10 also includes signal output terminal 28 and grounded terminal 30. Comparator 10 includes internal circuitry such that the ground voltage at terminal 30 is coupled to output terminal 28 in response to the binary values of bits $A_0$ and $B_0$ differing from each other and for decoupling terminal 28 from grounded terminal 30 in response to bits $A_0$ and $B_0$ having the same binary values. In other words, terminal 28 is grounded in response to $A_0=1$ while $B_0=0$ or in response to $A_0=0$ while $B_0=1$. Terminal 28 is decoupled from ground terminal 30 in response to $A_0=B_0=1$ or while $A_0=B_0=0$.

To achieve the aforementioned results, comparator 10 includes four N-channel field effect transistors (FETs) 41–44. FETs 41 and 42 have source drain paths connected in a first-series circuit with each other between output terminal 28 and ground terminal 30. FETs 43 and 44 have source drain paths connected in a second series circuit with each other between terminals 28 and 30. FETs 41 and 43 have gate electrodes respectively connected directly to the $A_0$ output of source 24 and connected to the output of source 24 via inverter 46. FETs 42 and 44 have gate electrodes connected to the $B_0$ signal derived by source 26 such that the gate of FET 42 is connected to source 26 via inverter 48 while the gate of FET 44 is connected directly to the $B_0$ output of source 26. Typically, each of inverters 46 and 48 includes a pair of complementary FETs having series connected source drain paths connected between ground and a positive power supply terminal (not shown) of the integrated circuit. The gates of the complementary transistors of inverters 46 and 48 are connected to the $A_0$ and $B_0$ outputs of sources 24 and 26, respectively. The drains of the complementary transistors in each inverter have a common terminal, such that the drains of the transistors of inverter 46 are tied to the gate of FET 43 and the common terminal of the drains of the transistors of inverter 48 is tied to the gate of FET 42.

In response to $A_0=1$ and $B_0=0$, the voltages at the gates of FETs 41 and 42 turn on the source drain paths of these FETs to provide a low impedance circuit between output terminal 28 and ground terminal 30. In response to $A_0=0$ and $B_0=1$, the voltages applied to the gates of FETs 43 and 44 turn on the source drain paths of these two FETs to couple the ground voltage at terminal 30 to output terminal 28. Values of $A_0=1$ and $B_0=1$ cause the source drain paths of FETs 41 and 44 to be turned off so that terminal 28 is decoupled from ground terminal 30. Similarly, but in an opposite manner, values of $A_0=B_0=1$ cause the source drain paths of transistors 43 and 42 to be turned off, so the ground voltage at terminal 28 is decoupled from terminal 30.

Output terminal 28 of comparator 10 is connected to lead 50, which is tied to the output terminals of all the remaining comparators 11, 12 . . . 16, 17. Lead 50 is coupled to the integrated circuit positive power supply voltage, $+V_{dd}$, through the source drain path of P-channel FET 52, having a grounded gate. Lead 50 is coupled to an input of inverter 54 which is constructed the same as described supra for inverters 46 and 48 to derive a bi-level output that swings approximately between the DC power supply voltage $+V_{dd}$ and ground in response to the bi-level values on lead 50.

In response to the ground voltage at terminal 28 being coupled to ground terminal 30 through one of the two parallel paths of comparator 10, i.e., through either the series connection of FETs 41 and 42 or through the series connection of FETs 43 and 44, a low, virtually ground voltage is applied to lead 50. The low voltage on lead 50, in combination with the ground voltage on the gate of FET 52, causes the source drain path of FET 52 to be cut off to isolate lead 50 from the $+V_{dd}$ power supply voltage applied to the source of FET 52.

In response to FETs 41–44 of comparator 10 causing terminal 28 to be decoupled from ground terminal 30, while all of the remaining comparators 11, 12 . . . 16, 17 have the output terminals thereof decoupled from the ground terminals thereof, lead 50 is decoupled from the ground terminals. Decoupling lead 50 from the ground terminals of comparators 10, 11, 12 . . . 16, 17 causes the source drain path of FET 52 to be turned on by the ground voltage applied to the gate of FET 52. Thereby, the positive power supply voltage $+V_{dd}$ applied to the source of FET 52 is applied through the source drain path of FET 52 to lead 50 so the bus is at the high voltage associated with $+V_{dd}$.

The circuit of FIG. 1 has several disadvantages. The transistor count for each of comparators 10, 11, 12 . . . 16, 17 is relatively high since six transistors are required in each comparator. Hence, to compare two 8-bit bytes, the eight comparators of FIG. 1 require 48 transistors. The six transistors in each comparator add significantly to the power requirements of the multi-bit comparator. The large number of transistors, in addition to requiring a significant amount of power, requires a significant amount of space on the integrated circuit chip and increases cost. The relatively large number of transistors required in the circuit of FIG. 1 also adversely affects performance because more transistors are required to pull down output terminals 28 of the comparators to ground.

It is, accordingly, an object of the present invention to provide a new and improved multi-bit comparator circuit.

Another object of the present invention is to provide a new and improved multi-bit comparator circuit for comparing like ordered bits of two bytes or words, wherein the circuit includes several comparators and is arranged so a binary signal having a value indicative of whether or not the binary bits have like values is derived.

Another object of the invention is to provide a new and improved multi-bit comparator circuit having a relatively low number of transistors, resulting in low cost, low power consumption, and reduced integrated circuit space requirements.

Another object of the invention is to provide a new and improved multi-bit comparator having relatively low capacitive loading of binary bit sources.

SUMMARY OF THE INVENTION

In accordance with one aspect of the present invention a circuit signals if any like ordered bits in first and second binary words differ, wherein each of the binary words has bits $N_0, N_1 \ldots N_k \ldots N_{(n-1)}$ so that the bits of the first word are $A_0 A_1 \ldots A_k \ldots A_{(n-1)}$ and the bits of the second word are $B_0, B_1 \ldots B_k \ldots B_{(n-1)}$, where k is 0 ... (n-1). The circuit comprises a comparator for each pair of like ordered bits and a common terminal. Each comparator includes first and second transistors, each having a path with bi-level impedance values. The transistors are arranged so that: (a) the first and second levels of bit $A_k$ are coupled to the common terminal via the path of the first transistor in response to bit $B_k$ having the first value, (b) the first and second levels of bit $B_k$ are coupled to the common terminal via the path of the second transistor in response to bit $A_k$ having the first value, (c) the first transistor path decouples bit $A_k$ from the common terminal and tends to cause the common terminal to be at the second level in response to bit $B_k$ having the second value, (d) the second transistor path decouples $B_k$ from the common terminal and tends to cause the common terminal to be at the second level in response to $A_k$ having the second value, and (e) the common terminal is at the second level only in response to $A_k \neq B_k$. An impedance connected between the common terminal and each of the paths maintains the common terminal at the second value in response to $A_i \neq B_i$, where i is any of 0 . . . (n-1).

Preferably the impedance is a circuit element connected as a diode polarized for preventing current from flowing between the common terminal and the path of both the first and second transistors of the comparator responsive to $A_k$ and $B_k$ in response to the common terminal being at the second level.

Another aspect of the invention relates to a comparator network for deriving a first binary output level in response to first and second like ordered binary bits of first and second binary bytes or words having the same value and for deriving a second binary output level in response to any of the first and second like ordered binary bits of the first and second binary bytes or words having differing values. The comparator network includes a load, a power supply terminal, and a comparator circuit for each of the first and second like ordered binary bits. Each comparator circuit comprises first and second signal input terminals respectively responsive to the first and second binary input bits. First and second transistors respectively have first and second variable impedance paths and first and second control electrodes that respectively control the impedances of the first and second paths in response to binary levels applied to the first and second control electrodes. The first variable impedance path and the load are connected in series between the first input signal terminal and power supply terminal. The second variable impedance path and the load are connected in series between the second input signal terminal and power supply terminal. The connections of the first and second variable impedance paths, the load and the power supply terminal are such that current can flow between the common terminal and the power supply terminal via the first and second variable impedance paths. The first control electrode is connected to respond to the second binary signal at the second terminal. The second control electrode is connected to respond to the first binary signal at the first terminal. The connections, transistors, load and common terminal are arranged so that: (1) in response to the first and second input bits having: (a) the same first values the variable impedances of the first and second transistors are sufficiently low that the first values of the first and second bits are coupled through the variable impedances of the first and second transistors to the common terminal, and (b) the same second values the variable impedances of the first and second transistors are sufficiently high that the values of the first and second bits are de-coupled from the common terminal and the common terminal is substantially at the level of the power supply terminal which is approximately equal to the level of the first and second bits coupled through the first and second transistors to the common terminal so the first binary output level is derived at the common terminal and (2) in response to the first and second input signals having differing values (a) the transistor having its variable impedance path connected to the input signal terminal responsive to the binary bit having the first value has a sufficiently high impedance path to decouple the binary bit having the first value from the common terminal, and (b) the transistor having its variable impedance path connected to the input signal terminal responsive to the binary bit having the second value has a sufficiently low impedance path to couple the binary bit having the second value to the common terminal so the second binary output level is derived at the common terminal.

All of the comparators are simultaneously responsive to a different pair of binary bits. The variable impedance paths of the transistors of each of the comparators are connected for selectively providing a current path between the common terminal and the input terminal associated with each of the binary bits. An impedance connected between the common terminal and the variable impedance paths of each comparator circuit prevents the common terminal from being at the first binary output level in response to any of the comparator circuits causing the common terminal to be at the second binary level.

The above and still further objects, features and advantages of the present invention will become apparent upon consideration of the following detailed description of one specific embodiment thereof, especially when taken in conjunction with the accompanying drawings.

BRIEF DESCRIPTION OF DRAWING

As described.

DETAILED DESCRIPTION OF FIG. 2

Figure 2:
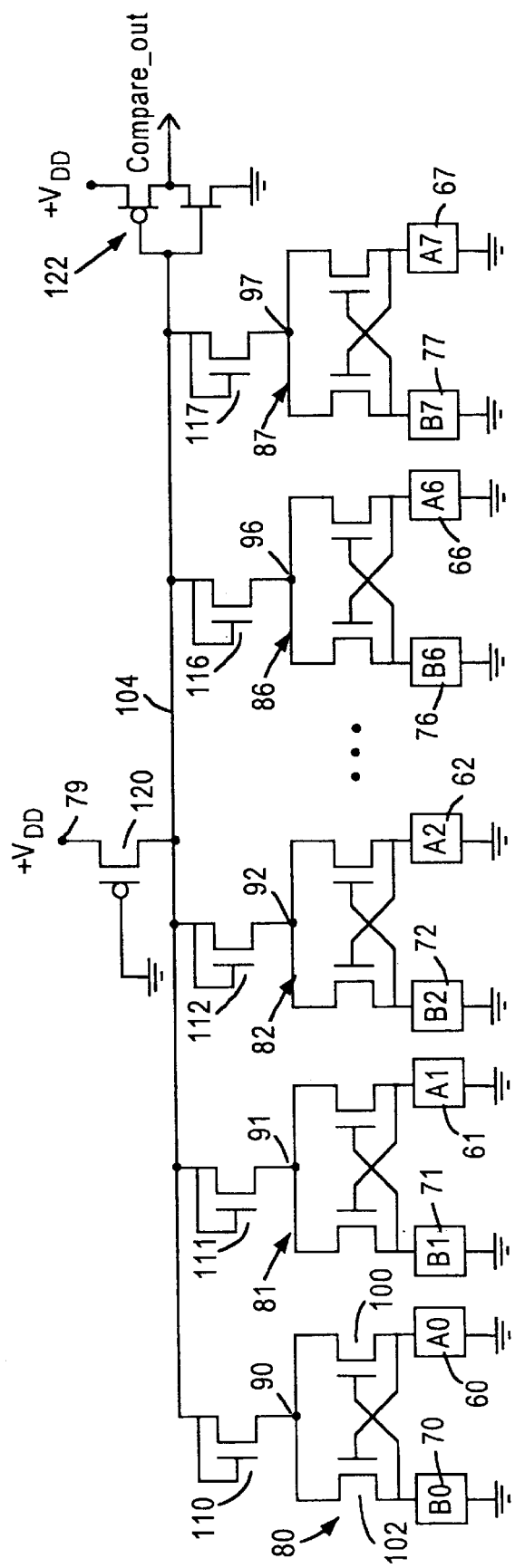
FIG. 2 is a circuit diagram of an a preferred embodiment of a comparator for like ordered bits of a pair of 8-bit bytes or words, in accordance with the present invention.

Reference is now made to FIG. 2 of the drawing, a circuit diagram of an integrated circuit for comparing like ordered bits of two 8-bit bytes or words. Binary bit signal sources 60, 61, 62 . . . 66, 67 respectively derive bits $A_0, A_1, A_2 \ldots A_6, A_7$ of the first byte or word, while binary bit signal sources 70, 71, 72 . . . 76, 77 respectively derive bits $B_0, B_1, B_2, B_6, B_7$ of the second byte or word. Each of signal sources 60, 61, 62 . . . 66, 67 and 70, 71, 72 . . . 76, 77 has a grounded terminal and a nominally ungrounded signal output terminal. The signal level at the nominally ungrounded output terminals of signal sources 60, 61, 62 . . . 66, 67 and 70, 71, 72 . . . 76, 77 has either a low voltage (i.e., is at ground potential) or a high voltage applied to positive power supply terminal 79 (i.e., at the integrated circuit power supply voltage $+V_{dd}$).

Comparator circuits 80, 81, 82 . . . 86, 87 respectively compare the binary values of the like ordered bits applied to them, so that, for example, comparator circuit 80 compares the binary values of $A_0$ and $B_0$ bits respectively derived from signal sources 60 and 70. Comparator 80 responds to the values of bits $A_0$ and $B_0$ so the voltage on output terminal 90 of comparator 80: (1) is high if $A_0=B_0=1$, (2) is low in response to $A_0 \neq B_0$, and (3) floats if $A_0=B_0=0$. The remaining comparators 81, 82 . . . 86, 87 respond to the like ordered binary input signals applied to them to supply bi-level signals to output terminals 91, 92 . . . 96, 97 thereof. Comparators 81, 82 . . . 86, 87 supply signals to terminals 91, 92 . . . 96, 97 on the same criteria that comparator 80 supplies bi-level signals to terminal 90.

Since each of comparators 80, 81, 82 . . . 86 and 87 is identical, a description of comparator 80 suffices for the remaining comparators. Comparator 80 includes two N-channel FETs 100 and 102. FET 100 has a source drain path connected between the ungrounded output terminal of $A_0$ signal source 60 and terminal 90, while FET 102 has a source drain path connected between the ungrounded output terminal of $B_0$ signal source 70 and terminal 90. FETs 100 and 102 have gates respectively connected to the output terminals of signal sources 70 and 60.

In response to $A_0=1$ and $B_0=1$, signal sources 60 and 70 respectively forward bias (i.e., turn on) the source drain paths of FETs 102 and 100 by virtue of the connections of signal sources to the gates of FETs 102 and 100. Consequently, the high voltage levels derived from signal sources 60 and 70 are supplied through the low impedance source drain paths of FETs 100 and 102 to terminal 90, so that terminal 90 is at a relatively high voltage. In response to $A_0=B_0=0$, the source drain paths of FETs 102 and 100 are off and the zero or ground voltages at the nominally ungrounded output terminals of signal sources 60 and 70 are decoupled from output terminal 90. Hence, in response to $A_0=B_0=1$, comparator 80 supplies a high voltage to terminal 90. In response to $A_0=B_0=0$, terminal 90 is decoupled from signal sources 60 and 70 and effectively floats relative to the signal output terminals of signal sources 60 and 70.

In response to $A_0=1$ and $B_0=0$, the source drain path of FET 102 is on, causing the low ground voltage at the output terminal of source 70 to be coupled through the low source drain impedance of FET 102 to output terminal 90, while the source drain path of FET 100 is off (i.e., has a high impedance) so the relatively high voltage at the output terminal of source 60 is decoupled from terminal 90. Similarly, but in an opposite sense, in response to $B_0=1$ and $A_0=0$, the low voltage at the nominally ungrounded output terminal of source 60 is coupled through the source drain path of FET 100 to terminal 90 while the high voltage at the output terminal of source 70 is decoupled from terminal 90 because of the off, high impedance state of the source drain path of FET 102. Thereby, the high voltage derived from source 70 is decoupled from terminal 90. Consequently, when $A_0$ is not equal to $B_0$, terminal 90 is maintained at a low voltage. The voltages at terminals 90, 91, 92 . . . 96, 97 are selectively coupled to lead 104 via diodes formed by N-channel FETs 110, 111, 112 . . . 116, 117, respectively. Each of FETs 110, 111, 112.. .116, 117 forms an impedance that is connected between the output terminal of the comparator with which the FET is associated and lead 104. Since each of FETs 110, 111, 112 . . . 116, 117 is constructed the same, the description of FET 110 is sufficient for the remaining FETs that are connected as diodes. FET 110 includes a source tied to terminal 90, as well as gate and drain terminals that are shorted together. The source of FET 110 thus functions as the anode of the diode while the common connection of the gate and drain of FET 110 form the cathode of the diode. The anode of the diode formed by FET 110 is tied to output terminal 90 of comparator 80 while the cathode of the diode is tied to lead 104.

Lead 104 is connected to $+V_{dd}$ power supply terminal 79 through the source drain path of P-channel FET 120, having a grounded gate electrode. Lead 104 is also connected to an input terminal of inverter 122. Inverter 122 is preferably a full feedback CMOS inverter including an N-channel field effect transistor having its source tied to ground and a P-channel field effect transistor having its source connected to $+V_{dd}$ terminal 79.

In operation, the voltage at lead 104 has a high value, approximately equal to $+V_{dd}$, in response to all of the like ordered bits of the two words or bytes being compared having the same value. If, however, two like ordered bits have different values, lead 104 has a low, substantially ground voltage. If, for example, each of $A_0, A_1, A_2 \ldots A_6, A_7$ has a binary zero value and each of the $B_0, B_1, B_2 \ldots B_6, B_7$ has a binary zero value, each of output terminals 90, 91, 92 . . . 96, 97 is decoupled from the voltages at the signal input terminals of comparators 80, 81, 82 . . . 86, 87. Accordingly, the source drain path of FET 120 applies voltage $+V_{dd}$ at terminal 79 to lead 104, whereby lead 104 applies a high input voltage to inverter 122 which accordingly derives a binary zero or virtually ground output. In response to all of sources 60, 61, 62 . . . 66, 67 and 70, 71, 72 . . . 76, 77 having binary one values, comparators 80, 81, 82 . . . 86, 87 respectively supply high voltages to output terminals 90, 91, 92 . . . 96, 97.

The source drain path of field effect transistor 120 supplies voltage $+V_{DD}$ at terminal 79 to lead 104 while the high voltage levels are on output terminals 90, 91, 92 . . . 96, 97 causing diodes 110, 111, 112 . . . 116, 117 to be in the non-conductive, i.e., high impedance state. The result is that lead 104 supplies a high voltage level to inverter 122 by virtue of the high voltages that sources 60–67 and 70–77 apply to lead 104.

Lead 104 has a high voltage as long as all of the like ordered bits of the two bytes or words have the same value. For example, if bits $A_0=B_0=0$ and the remaining bits $A_1-A_7$ and $B_1-B_7$ have binary 1 values, each of comparators 81, 82 . . . 86, 87 supplies a high voltage to lead 104 while output terminal 90 of comparator 80 is decoupled from the zero binary values of sources 60 and 70, which derive $A_0=B_0=0$. Consequently, comparators 82, 82, . . . 86, 87 maintain lead 104 at the high voltage under these circumstances. Because the source drain paths in the FETs in each of comparators 80, 81, 82 . . . 86, 87 is effectively in parallel with lead 104, to function as pull-down circuits, the voltage of lead 104 is not dependent on the number of comparators deriving a high voltage on its output terminal.

If one of the like ordered bits of the two bytes or words being compared have different values, the voltage of lead 104 is pulled down to a low value, approximately equal to ground. For example, if bit $A_0$ is not equal to bit $B_0$ while the remaining bits of the two words being compared are the same, the resulting low voltage at terminal 90 is coupled through the diode formed by FET 110 to lead 104, while the high voltages at some of output terminals 91, 92 . . . 96, 97 are decoupled from the lead by diodes respectively formed by FETs 111, 112 . . . 116, 117. The output terminals 91, 92 . . . 96, 97 of the comparators which are responsive to A=B=0 do not affect the voltage on lead 104 because these output terminals effectively float, as previously described. In the foregoing situation, diodes 111, 112 . . . 116, 117 isolate terminals 91, 92 . . . 96, 97 from lead 104 and prevent a "drive fight" from the output terminals of comparators 81, 82 . . . 86, 87 that are responsive to A=B=1.

Figure 1:
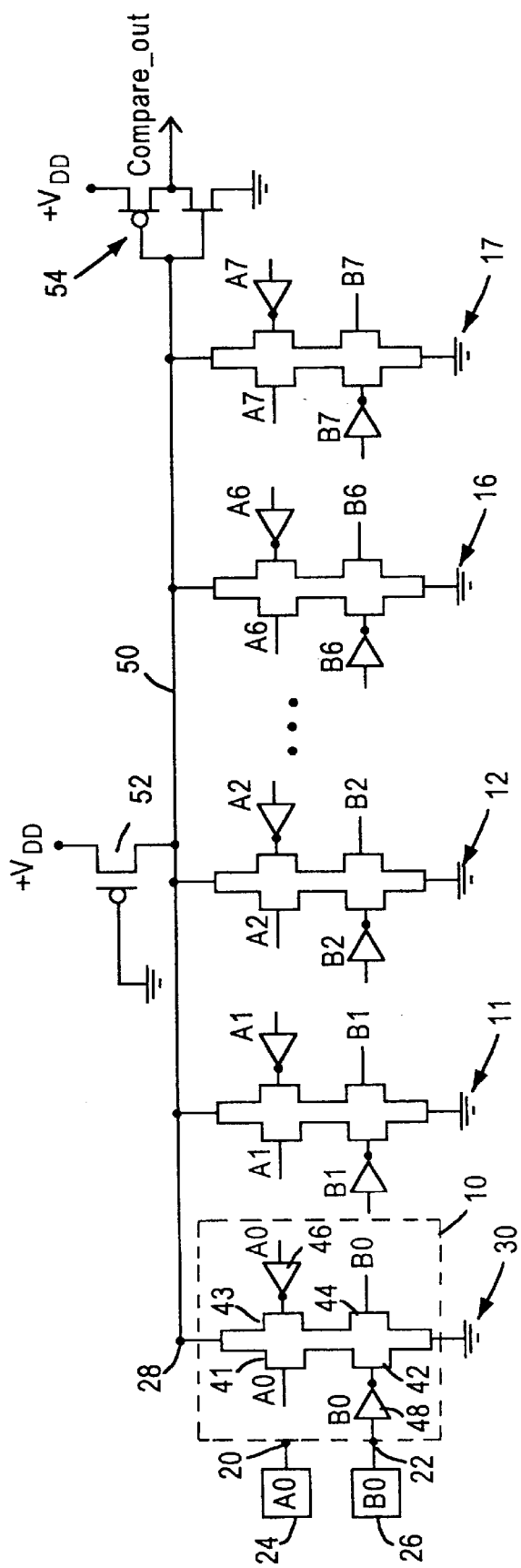
FIG. 1 is a circuit diagram of a prior art integrated circuit for comparing like ordered bits of a pair of 8-bit bytes or words.

From the foregoing, the circuitry associated with each pair of like ordered bits includes only three FETs, e.g., FETs 100, 102 and 110, in contrast to the eight FET arrangement of FIG. 1. The area savings of the smaller size FETs plus the reduced number of FETs in the circuit of FIG. 2 compared to FIG. 1 results in the circuit of FIG. 2 having a considerably smaller area and power consumption than the circuit of FIG. 1.

While there has been described and illustrated one specific embodiment of the invention, it will be clear that variations in the details of the embodiment specifically illustrated and described may be made without departing from the true spirit and scope of the invention as defined in the appended claims. For example, while the circuit of FIG. 2 has been illustrated as a static device, the principles of the invention are also applicable to a dynamic situation, wherein a clock pulse train is applied, inter alia, to the gate of P-channel field effect transistor 120.

What is claimed:

1. A comparator network for deriving a first binary output level in response to first and second like ordered binary bits of first and second binary bytes or words having the same value and for deriving a second binary output level in response to any of the first and second like ordered binary bits of the first and second binary bytes or words having differing values, the comparator network including a load;

a power supply terminal; and for each of the like ordered bits a comparator circuit having: first and second signal input terminals for being respectively responsive to the first and second binary input bits, first and second transistors respectively having first and second variable impedance paths and first and second control electrodes, the impedances of the first and second paths being respectively controlled by binary levels applied to the first and second control electrodes; the first variable impedance path and the load being connected in series between the first input signal terminal and the power supply terminal; the second variable impedance path and the load being connected in series between the second input signal terminal and the power supply terminal; the connections of the first and second variable impedance paths, the load and the power supply terminal being such that current can flow between the first and second signal input terminals and the power supply terminal via the first and second variable impedance paths and a common terminal for the first and second variable impedance paths, the first control electrode being connected to respond to the second binary signal at the second signal input terminal, the second control electrode being connected to respond to the first binary signal at the first signal input terminal, the connections, transistors, load and common terminal being arranged so that (1) in response to the first and second binary input bits having: (a) the same first values the variable impedances of the first and second transistors are sufficiently low that the first values of the first and second bits are coupled through the variable impedances of the first and second transistors to the common terminal and (b) the same second values the variable impedances of the first and second transistors are sufficiently high that the values of the first and second bits are de-coupled from the common terminal whereby the common terminal is substantially at the voltage of the power supply terminal, the power supply terminal being at a voltage approximately equal to the voltage of the first and second bits as coupled through the first and second transistors to the common terminal so the first binary output level is derived at the common terminal and (2) in response to the first and second input signals having differing values (a) the transistor having its variable impedance path connected to the input signal terminal responsive to the binary bit having the first value has a sufficiently high impedance path to decouple the binary bit having the first value from the common terminal, and (b) the transistor having its variable impedance path connected to the input signal terminal responsive to the binary bit having the second value has a sufficiently low impedance path to couple the binary bit having the second value to the common terminal so the second binary output level is derived at the common terminal, each of the comparators being connected to the first and second signal input terminals so as to be simultaneously responsive to a different pair of binary bits, the variable impedance paths of the transistors of each of the comparators being connected for selectively providing a current path between the common terminal and the signal input terminal associated with each of the binary bits, and an impedance connected between the common terminal and the variable impedance paths of each comparator circuit, each of the impedances being arranged for preventing the common terminal from being at the first binary output level in response to any of the comparator circuits causing the common terminal to be at the second binary level.

2. The comparator circuit of claim 1, wherein each of the impedances includes a circuit element connected as a diode polarized for preventing current from flowing between the common terminal and the variable impedance paths of the transistors of each comparator circuit in response to any of the comparator circuits causing the common terminal to be at the second level.

3. The comparator circuit of claim 2, wherein the transistors are field effect transistors, the variable impedance paths are source drain paths of the field effect transistors, and the control electrodes are gates of the field effect transistors, and the circuit elements are field effect transistors having common gate and drain terminals.

4. The comparator circuit of claim 1, wherein the transistors are field effect transistors, the variable impedance paths are source drain paths of the field effect transistors, and the control electrodes are gates of the field effect transistors.

5. A circuit for signalling if any like ordered bits in first and second binary words differ, each of the binary words having bits $N_0, N_1 \ldots N_k \ldots N_{(n-1)}$ so that the bits of the first word are $A_0 A_1 \ldots A_k \ldots A_{(n-1)}$ and the bits of the second word are $B_0, B_1 \ldots B_k \ldots B_{(n-1)}$, where k is 0 ... (n−1), the circuit comprising a comparator for each pair of like ordered bits, a common terminal, each comparator including first and second transistors each having a path with bi-level impedance values, the transistors being arranged so that (a) the first and second levels of bit $A_k$ are coupled to the common terminal via the path of the first transistor in response to bit $B_k$ having the first value, (b) the first and second levels of bit $B_k$ are coupled to the common terminal via the path of the second transistor in response to bit $A_k$ having the first value, (c) the first transistor path decouples bit $A_k$ from the common terminal and tends to cause the common terminal to be at the second level in response to bit $B_k$ having the second value, (d) the second transistor path decouples $B_k$ from the common terminal and tends to cause the common terminal to be at the second level in response to $A_k$ having the second value, and (e) the common terminal is at the second level only in response to $A_k \ne B_k$; and a separate impedance for each of the paths being connected between the common terminal and the respective path for maintaining the common terminal at the second value in response to $A_i \ne B_i$, where i is any of 0 ... (n−1).

6. The circuit of claim 5, wherein the impedance includes a circuit element connected as a diode polarized for preventing current from flowing between the common terminal and the path of both the first and second transistors of the comparator responsive to bits $A_k$ and $B_k$ in response to the common terminal being at the second level.

7. The circuit of claim 6, wherein the transistors are field effect transistors, the variable impedance paths are source drain paths of the field effect transistors, and the control electrodes are gates of the field effect transistors, and the circuit elements are field effect transistors having common gate drain terminals.

8. The circuit of claim 5, wherein each of the impedances includes a circuit element connected as a diode polarized for preventing current from flowing between the common terminal and the variable impedance paths of the transistors of each comparator circuit in response to any of the comparator circuits causing the common terminal to be at the second level.

9. The circuit of claim 5 further including a circuit element having a variable impedance connected between a power supply terminal and the common terminal, the circuit element having a high impedance to decouple the common terminal from the power supply terminal in response to the common terminal being at a voltage substantially different from the voltage at the power supply terminal, and a low impedance to couple the common terminal to the power supply terminal in response to the common terminal being at a voltage substantially the same as the voltage as the power supply terminal.

10. The circuit of claim 9 wherein each of the first and second transistors is of a first conductivity type and the circuit element is a transistor of a second conductivity type.

11. The circuit of claim 10 wherein each of the first and second transistors is an N-type FET and the transistor of the second conductivity type is a P-type FET.

* * * * *